United States Patent [19]  
Herpich et al.

[11] 3,777,917  
[45] *Dec. 11, 1973

[54] TAILGATE FOR A REAR LOADER REFUSE VEHICLE

[75] Inventors: William A. Herpich; Donal W. Chaney, both of Galion, Ohio; George W. Palmer, Durant, Okla.

[73] Assignee: Peabody Galion Corporation, Galion, Ohio

[ * ] Notice: The portion of the term of this patent subsequent to July 17, 1990, has been disclaimed.

[22] Filed: Apr. 5, 1972

[21] Appl. No.: 241,183

Related U.S. Application Data

[63] Continuation-in-part of Ser. No. 165,517, July 23, 1971.

[52] U.S. Cl. ............................................. 214/83.3  
[51] Int. Cl. ............................................. B65f 3/00  
[58] Field of Search .................... 214/83.3, 503; 100/100, 229 A

[56] References Cited  
UNITED STATES PATENTS  
3,615,029   10/1971   Anderson .......................... 214/83.3  
3,662,908   5/1972    Boda ................................ 214/83.3

*Primary Examiner*—Albert J. Makay  
*Attorney*—Carl F. Schaffer et al.

[57] ABSTRACT

A rear loading refuse vehicle having a tailgate that is pivotally mounted at its upper forward end to the rear of the vehicle body. The tailgate has a hopper-like bottom into which refuse is dumped. Straight, upwardly inclined, parallel guide tracks are provided, one in each of the sidewalls of the tailgate and a slide member is reciprocable in each guide track. Each of a first pair of lineally extensible power cylinders is mounted at its lower end on the outer side of the sidewall and extends upwardly and forwardly in alignment with the respective guide track, the upper end of the rod of the cylinder being connected directly to the respective one of the slide members. A rectangular packer blade extends across the tailgate. Pivots carried by the slide members mount the upper end of the packer blade. Second extensible power cylinders are located interiorly of the tailgate at the inner sides of the side walls, the upper ends thereof being pivotally mounted at the upper rear corners of the tailgate and the lower ends thereof being pivotally connected to the sides of the packer blade intermediate its ends. A sliding fall-back shield is attached to the slide members and extends across between the side walls of the tailgate above the upper end of the packer blade where it overlaps a stationary fall-back shield which closes off the upper forward portion of the tailgate.

5 Claims, 13 Drawing Figures

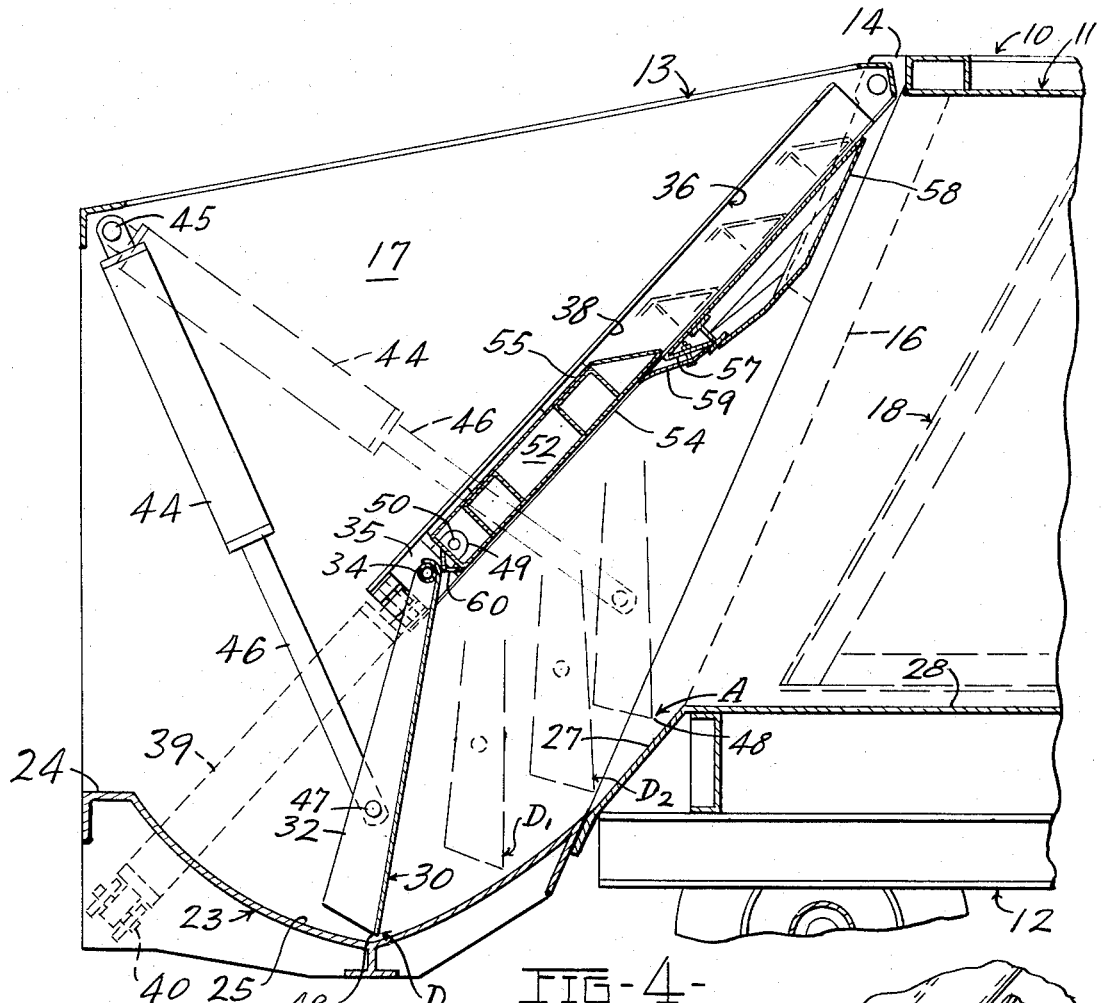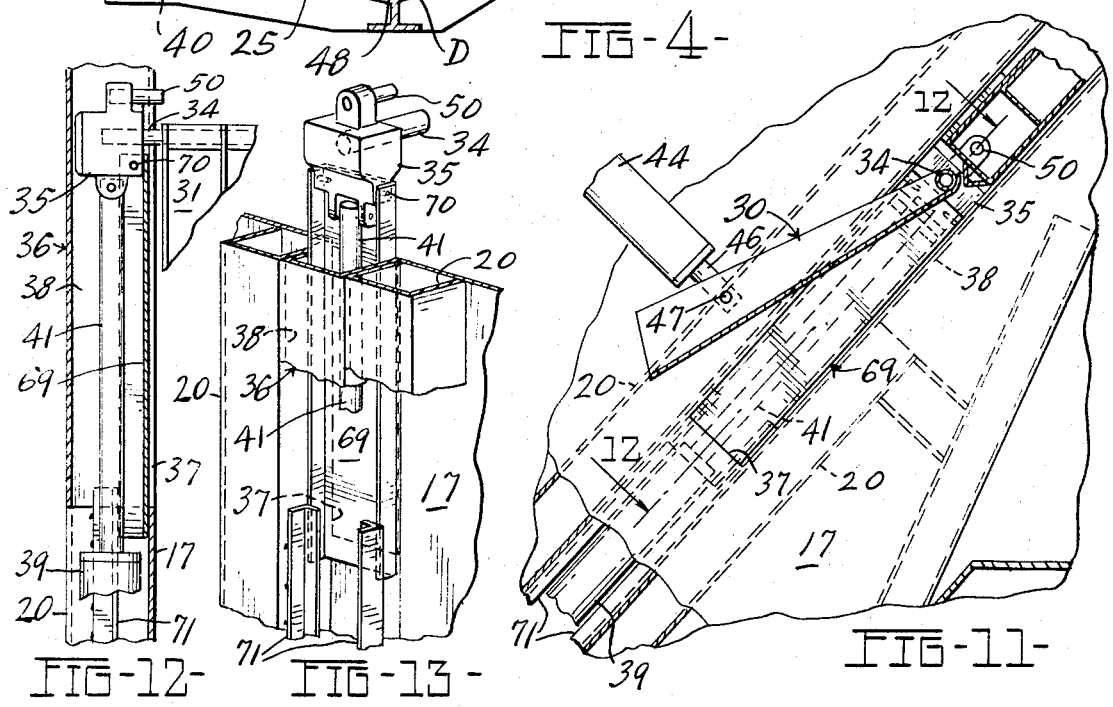

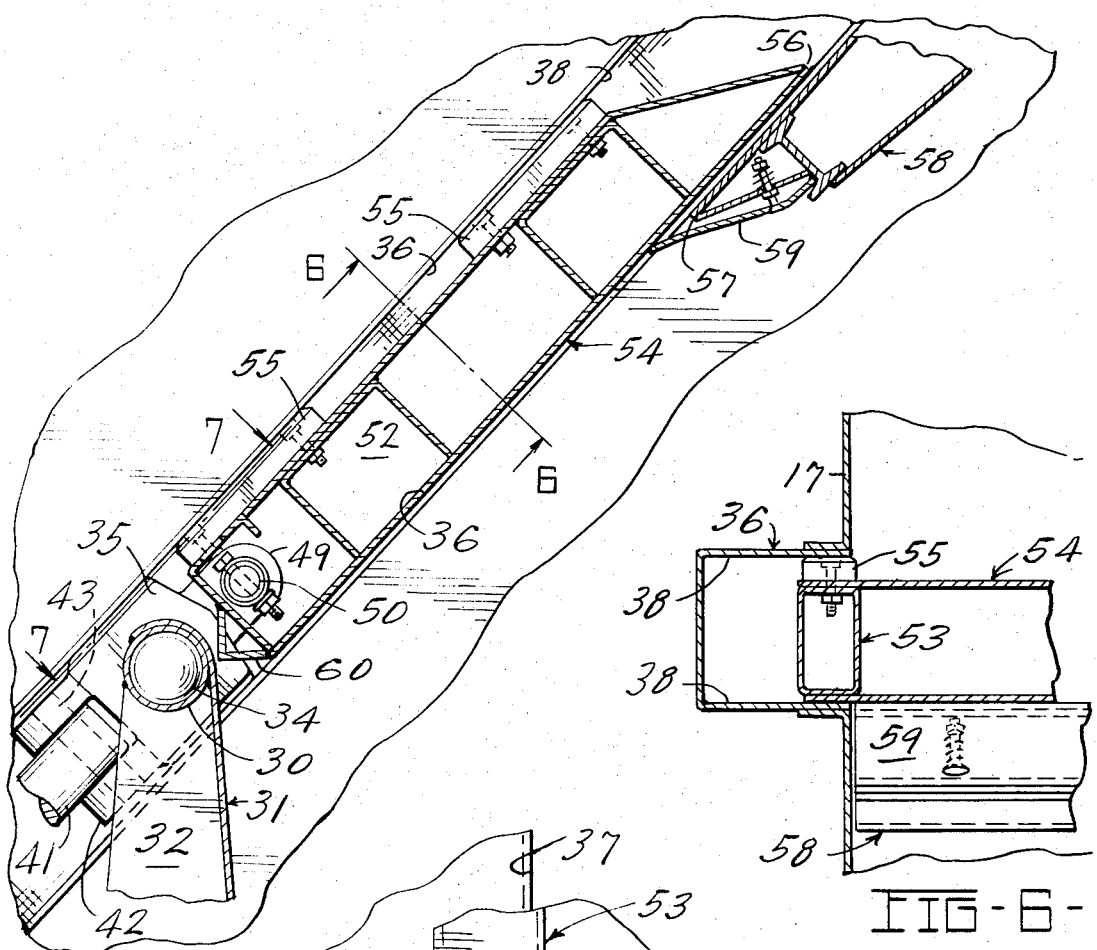
FIG-5-
FIG-6-
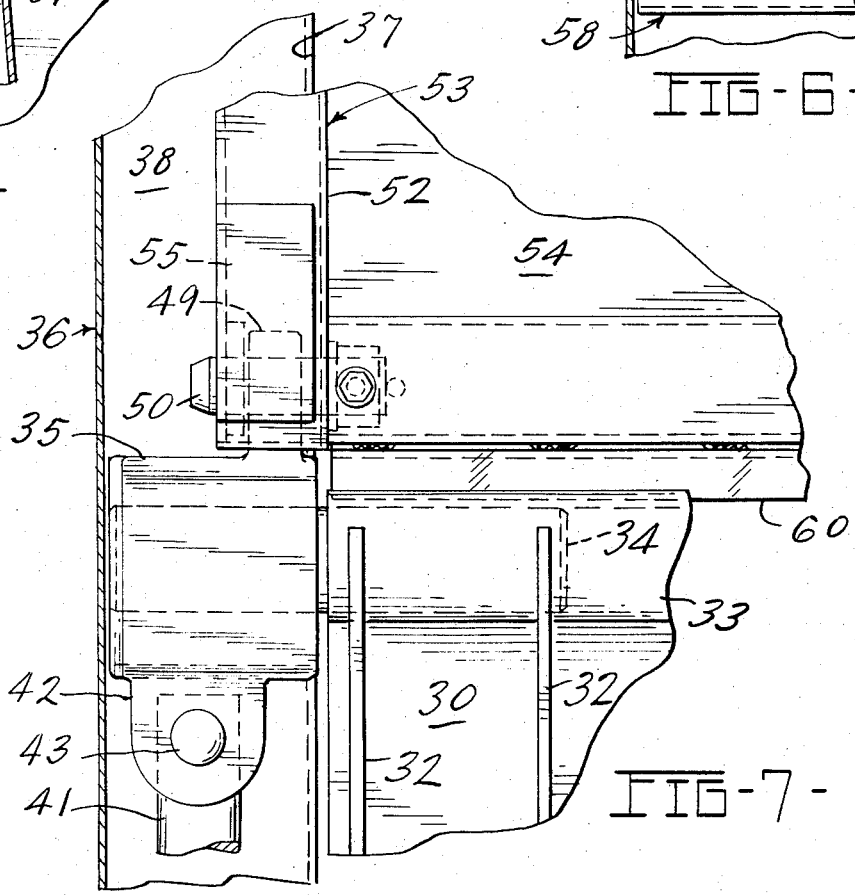
FIG-7-

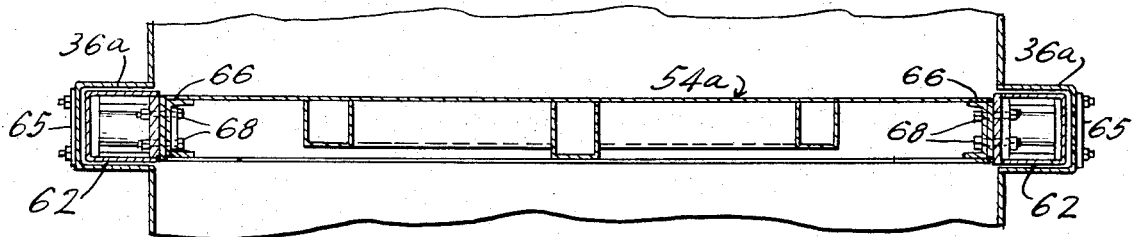
FIG-9-
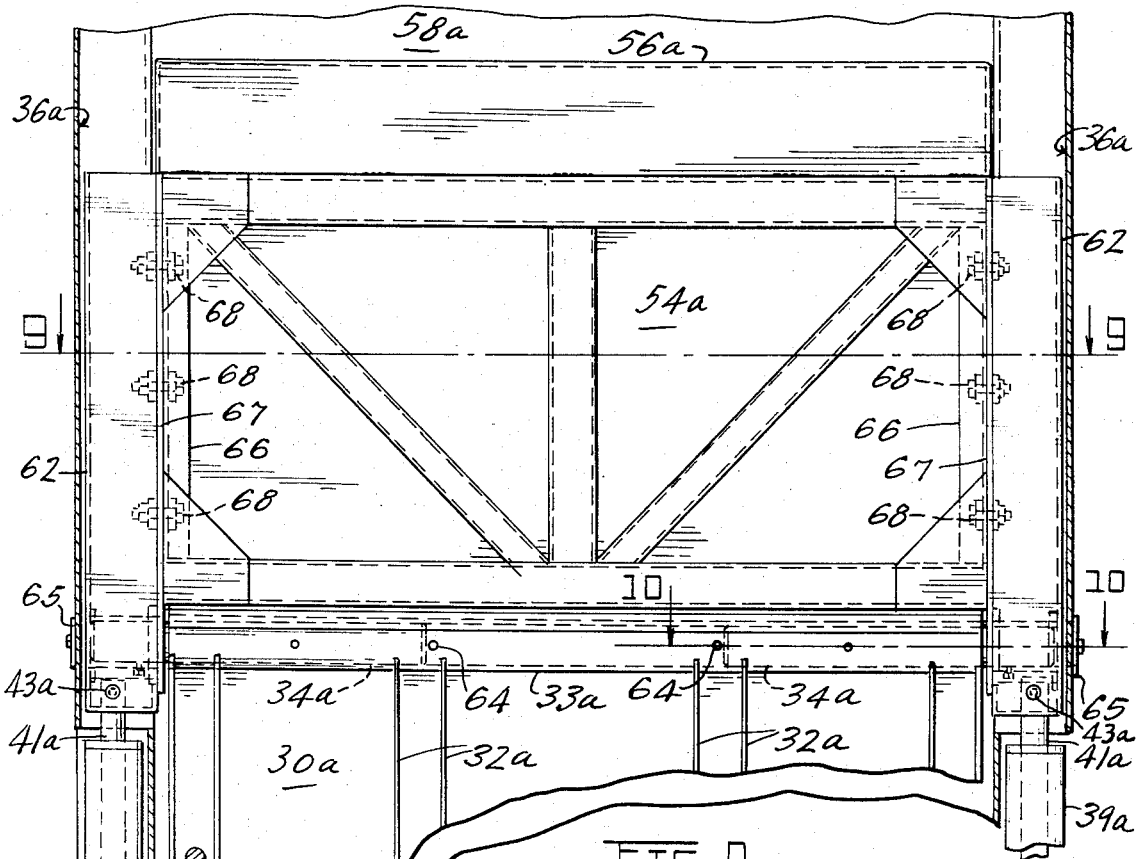
FIG-8-
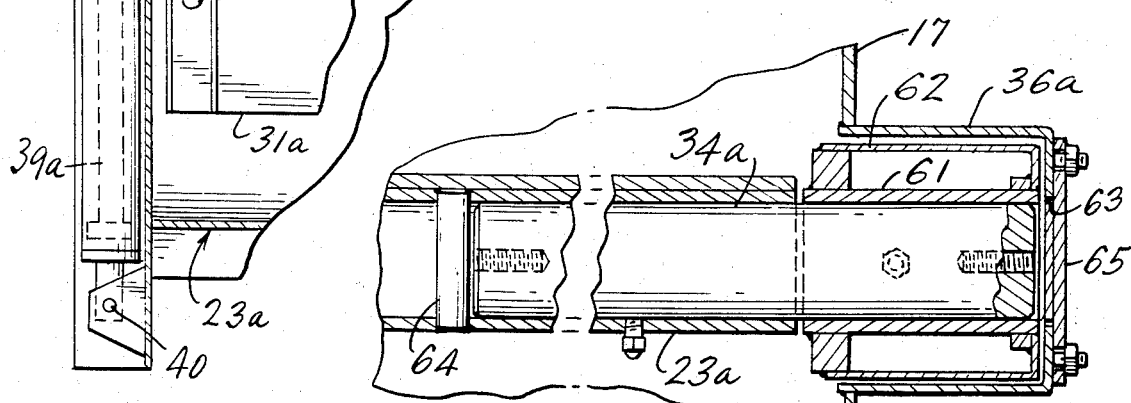
FIG-10-

TAILGATE FOR A REAR LOADER REFUSE VEHICLE

This application is a continuation-in-part of our co-pending application. Ser. No. 165,517 filed July 23, 1971.

BACKGROUND OF THE INVENTION

Rear loading refuse vehicles have become a standard, commercial type of vehicle for the collection of refuse, for example, in municipal collection systems, wherein domestic refuse cans are emptied into the hopper-like tailgate of such a vehicle by sanitary department workers, and many designs for the interior mechanisms of such vehicles have been proposed.

Most of this type of vehicle which have been successful have a hopper-like depression in the bottom of the tailgate, a packer blade which is cycled back and forth through the tailgate to sweep refuse upwardly and forwardly out of the hopper into the body and mechanical and hydraulic structure which actuates the packer blade in its excursions.

Many patents have been granted on rear loading vehicles of this general type including, among others, Gollnick U.S. Pat. Nos. 3,143,230 and 3,348,708 as well as more recent patents to Appleman et al. U.S. Pat. No. 3,615,028 and Anderson U.S. Pat. No. 3,615,029. These patents and others are principally directed toward the mechanical structures by which power is applied to the packer blades in order to move the packer blade backwardly over refuse in the hopper and forwardly through the hopper, to move refuse into the bodies of the vehicles against refuse already collected in the vehicles, thus to achieve a degree of pre-compaction. Efforts also have been made to reduce the cost of the structures while still retaining sufficient strength to withstand the forces to which they are subjected. The mechanisms of the mentioned patents, however, share one fault which apparently has not yet been overcome in this general type of loader.

When the power mechanism for a pivoted packer blade is actuated to sweep the packer blade downwardly and forwardly through the refuse hopper and to carry the refuse in that hopper upwardly into the body of the vehicle, the resistance to movement and precompaction in the refuse itself, exerts a very heavy "back-pressure" on the mechanism which is moving the packer blade forwardly. Where the packer blade is guided by movement along guide tracks and particularly, where an imporatnat power means also travels with the packer blade in the guide tracks, this "back-pressure" of the mentioned designs results in applying excessive force to the tracks themselves and to the powering mechanism so that great strength at high cost must be built into these portions of the structures.

It is therefore the principal object of the instant invention to provide a rear loading refuse vehicle in which the packer blade moving mechanism is so designed as to transfer the forces resisting movement and pre-compaction of the refuse to the body of the tailgate itself so as not to cause excessive wear on the working parts and, particularly, so as not to apply localized excessive forces to the guiding mechanisms.

It is yet another object of the instant invention to provide a refuse packing mechanism in a tailgate or rear loading refuse vehicle which includes a packer blade actuated by power means which moves the upper end of the packer blade back and forth in an inclined guide track and by power means which sweeps the packer blade back and forth arcuately relative to its upper guided end to move accumulated refuse out of the tailgate into the refuse truck and which functions effectively to pre-compact such refuse and to retain it in the truck between packing cycles.

It is yet another object of the instant invention to provide such a refuse packing mechanism wherein the force both to move the packer blade in the guide track and to sweep it back and forth relative to its movable pivot point is exerted by power mechanisms which act between the packer blade and the structure of the refuse truck thereby to provide for the application of greater power to both such movements of the packer blade than is possible to achieve in constructions wherein force is exerted between elements of the packing mechanism which are all movable during a packing cycle.

This application is a continuation-in-part of our co-pending application Ser. No. 165,517 filed July 23, 1971.

BRIEF DESCRIPTION OF THE DRAWINGS

FIG. 4 is a view simlar to FIG. 3 but showing the mechanism in a different position, particularly illustrating the beginning of the refuse packing stroke;

FIG. 5 is a fragmentary, detailed view in section taken along the line 5—5 of FIG. 2 and shown on an enlarged scale;

FIG. 6 is a fragmentary, detailed view taken along the line 6—6 of FIG. 5;

FIG. 7 is a fragmentary, detailed view taken from the position indicated by the line 7—7 of FIG. 5;

FIG. 8 is a fragmentary view similar to FIG. 2 but showing a modified form of travelling fall-back shield for use in an apparatus embodying the invention;

FIG. 9 is a fragmentary, horizontal sectional view taken along the line 9—9 of FIG. 8;

FIG. 10 is a fragmentary, sectional view taken along the line 10—10 of FIG. 8 and shown on an enlarged scale;

FIG. 11 is a fragmentary view, similar in part to FIG. 3, and illustrating a track cover;

FIG. 12 is a fragmentary sectional view taken along line 12—12 of FIG. 11; and

FIG. 13 is a fragmentary view in perspective illustrating the track cover and its attachment to other movable parts of the mechanism.

DESCRIPTION OF PREFERRED EMBODIMENT

Figure 1:
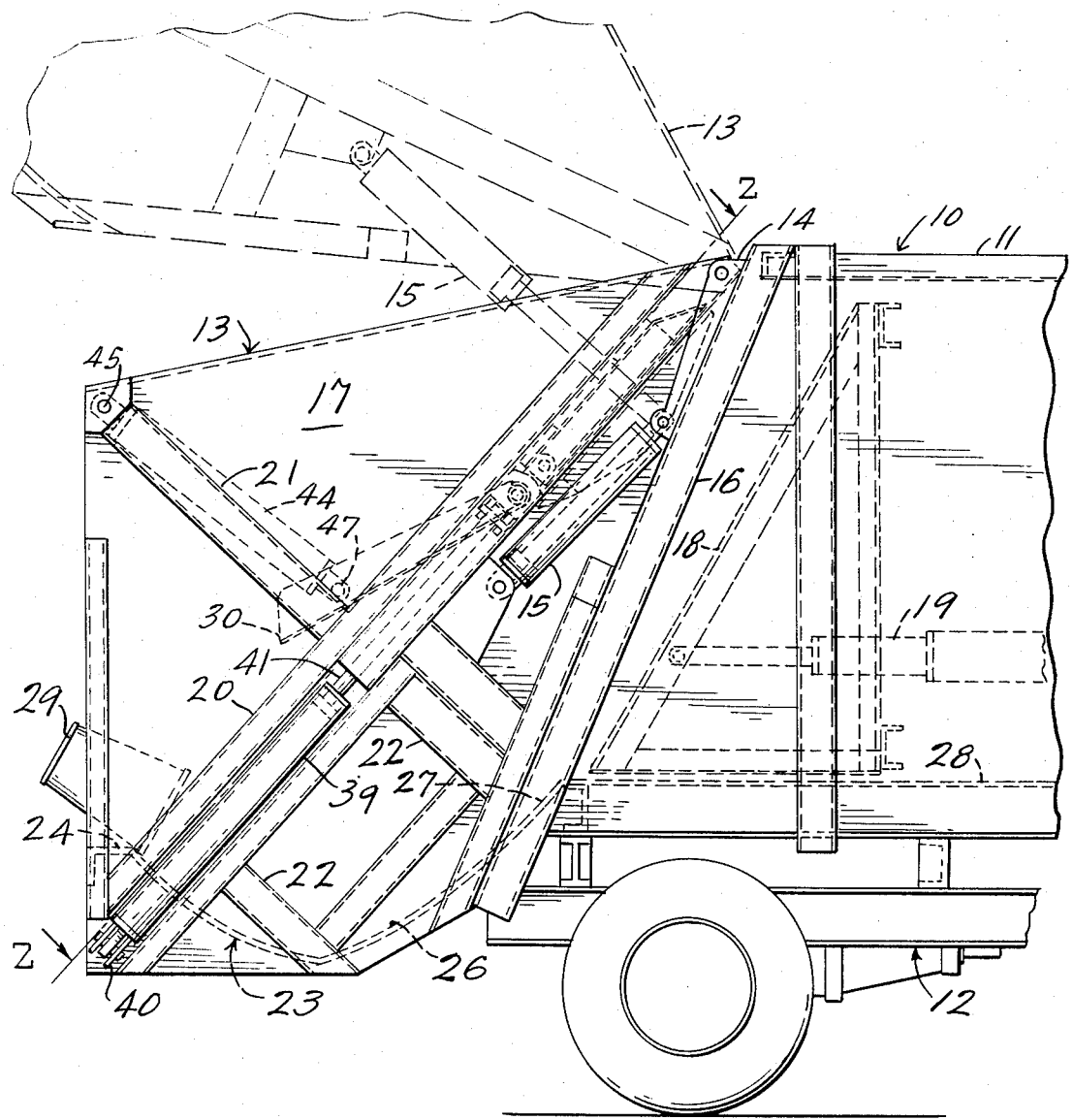
FIG. 1 is a fragmentary view in side elevation of the rear end of a refuse vehicle equipped with a rear loading tailgate embodying the invention.
Figure 2:
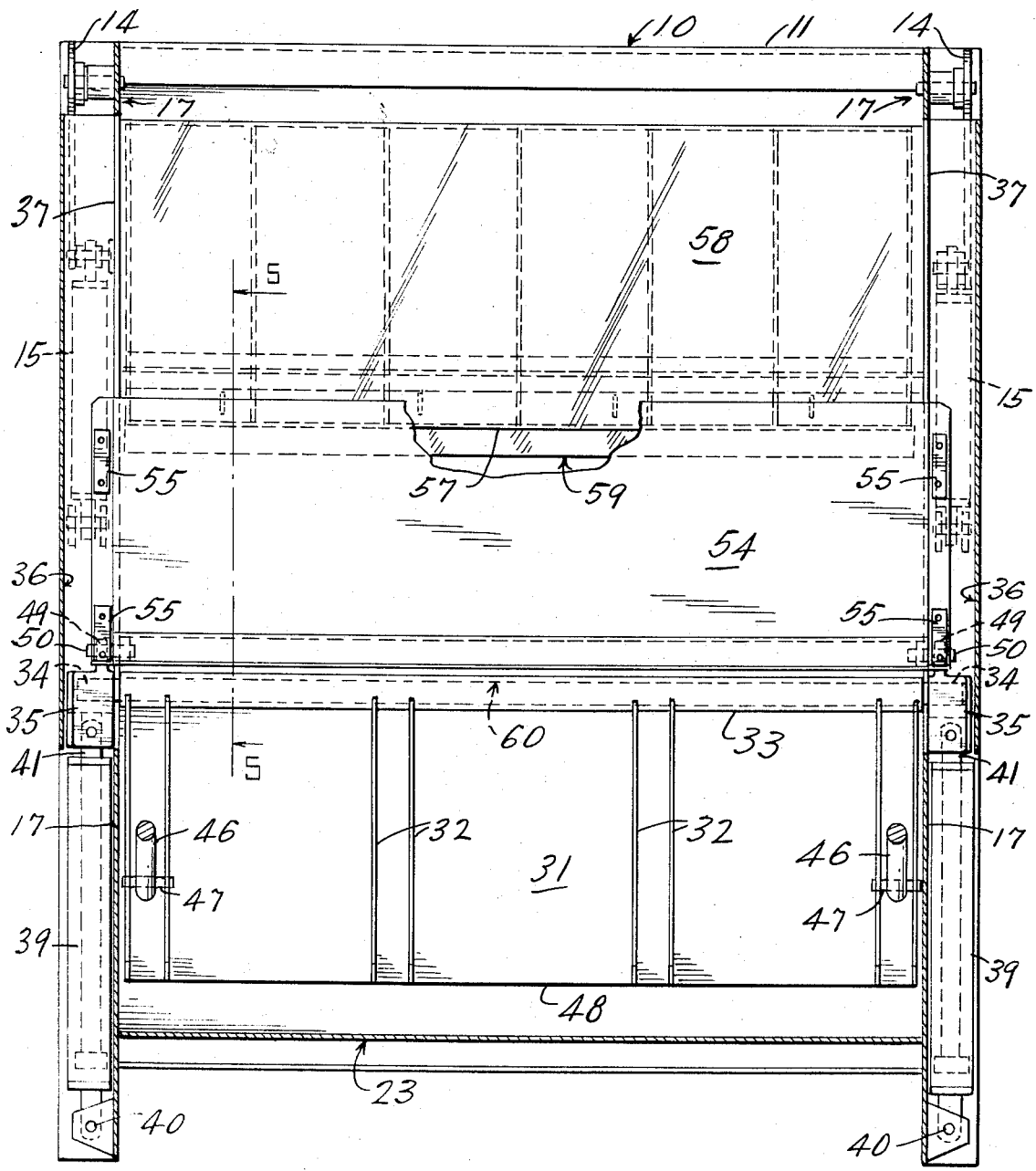
FIG. 2 is a rear view taken along the line 2—2 of FIG. 1 and showing the packer blade and associated mechanism with some parts shown in section.

A rear loading refuse vehicle generally indicated by the reference number 10 has a generally rectangular body 11 mounted on a heavy-duty chassis 12. A tailgate 13 is pivotally mounted by heavy ears 14 at the upper rear corner of the body 11. In normal position the tailgate 13 closes off the rear of the body 11 but maybe swung upwardly into elevated position, shown in dotted lines in FIG. 1, by the action of tailgate elevating cylinders 15 which are connected between the sides of a body end frame 16 and side walls 17 of the tailgate 13. When the tailgate 13 is in the elevated position, refuse is discharged from the then open rear end of the body 11 by an ejector plate 18 located interiorly of the body 11 and movable therethrough from front to back, for example, by a heavy telescoping hydraulic cylinder 19.

Figure 3:
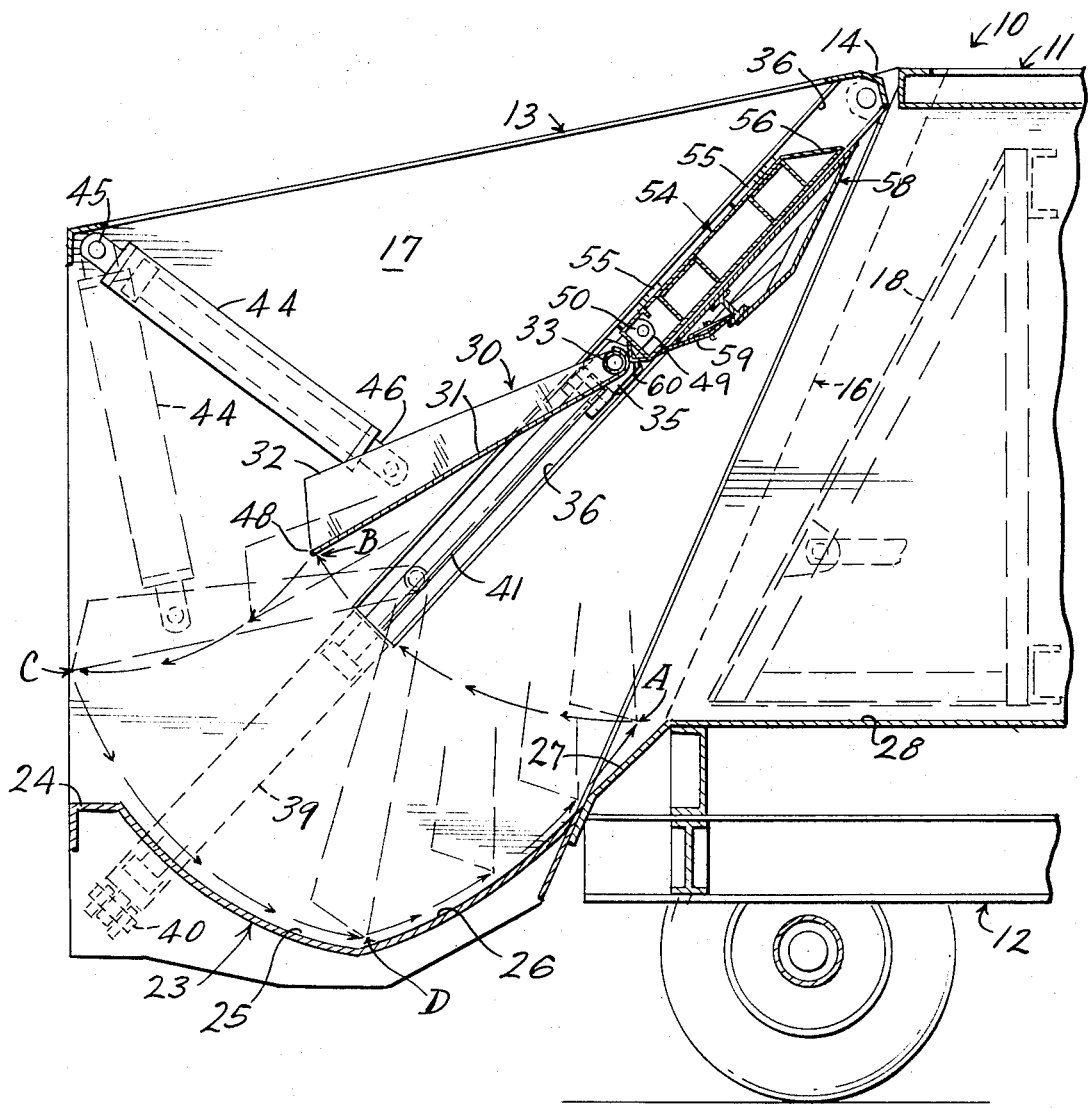
FIG. 3 is a longitudinal, vertical sectional view of an apparatus embodying the invention, illustrating the movement of the packer blade backwardly over refuse in the hopper of the tailgate.

The two spaced vertical side walls 17 of the tailgate 13 are rigidified by heavy channels such as the parallel guide channels 20 and cross channels 21 and 22 and by a bottom hopper 23 (FIG. 3). A heavy sill 24 extends across the tailgate 13 between the side walls 17 at the upper rear margin of the hopper 23. The hopper 23 comprises two arcuate portions 25 and 26 of generally V-shaped, longitudinal cross section, the front edge of the portion 26 blending into an apron 27 at the rear of the body 11 which leads upwardly to a body floor 28. The rear of the tailgate 13 is open in the area above the sill 24 to enable refuse to be dumped through such opening from containers such as the refuse can 29 shown in FIG. 1.

A transversely extending, generally rectangular, packer blade 30 comprises a flat front panel 31 strengthened by a plurality of ribs 32, the upper, forward edge of the panel 31 being curved around and welded to a heavy cross tube 33 (see also FIGS. 5 and 7) to which the ends of the ribs 32 are also rigidly welded. A heavy pivot pin 34 is set into each open end of the tube 33 and protrudes laterally therefrom, being received in a suitable bore in a slide block 35 at each side of the packer blade 30. The slide blocks 35 are reciprocable in a pair of upwardly and forwardly inclined guide tracks 36 which overlie slots 37 in the side walls 17. The guide tracks 36 are closed at their outer sides and have parallel front and back walls 38 between which the blocks 35 slide.

The blocks 35 and thus the upper end of the packer blade 30 are moved back and forth in the guide tracks 36 by a first pair of lineally extensible hydraulic cylinders 39 one of which is mounted on the outer side of each of the side walls 17. The lower ends of the cylinders 39 are secured to the lower rear corners of the side walls 17, for example, by pin and clevis mountings 40 with their center lines aligned with the center lines of the guide tracks 36 and the upper ends of their piston rods 41 (FIGS. 5 and 7) extend between spaced ears 42 of the slide blocks 35 and are secured therein by cross pins 43. Thus when hydraulic fluid is applied to opposite ends of the cylinders 39, their rods 41 are extended or retracted, the slide blocks 35 are moved up or down the guide tracks 36 and the upper end of the packer blade 30 is carried between its uppermost position as illustrated in FIG. 3 and its lowermost position as illustrated in FIG. 4.

Second hydraulic cylinders 44 are pivotally mounted, one at each side and interiorly of the tailgate 13, by heavy pivot pins 45 to which the upper rear ends of the cylinders 44 are connected. The ends of piston rods 46 of the hydraulic cylinders 44 are pivotally connected, one at each side, to the packer blade 30 by heavy pins 47 which extend through the ribs 32 along a line removed from the upper end of the packer blade 30 where it is pivoted in the slide blocks 35 and closer to its trailing edge 48. As can best be seen by reference to FIGS. 3 and 4, the packer blade 30 is moved through a cycle in which its trailing edge 48 is moved through a closed path consisting of four curved legs A–B, B–C, C–D, and D–A.

In Position A (shown in broken lines in FIG. 4) the packer blade 30 is at its upper forward most position, closing off the lower portion of the rear open end of the body 11 and leaving the hopper 23 fully opened for the receipt of refuse dumped through the open rear end of the tailgate 13. In this position slide blocks 35 are at the upper end of their travel in the guide tracks 36 and the piston rods 41 are fully extended out of their hydraulic cylinders 39. The piston rods 46 are also fully extended. It will be noted in FIG. 4 that the trailing edge 48 of the packer blade 30 extends upwardly almost to the level of the floor 28 of the vehicle and overlies the vehicle floor apron 27.

After a sufficient quantity of refuse has been dumped into the hopper 23 to require it to be moved forwardly and upwardly into the body 11, the operator actuates controls for the hydraulic circuit comprising the necessary lines, pump and reservoir to apply pressure to the cylinders 44 to retract their rods 46 and to swing the packer blade 30 along the path A–B, moving its trailing edge 48 upwardly and rearwardly to Position B, shown in solid lines in FIG. 3. Because there is no force resisting this retractive movement, this portion of the excursion of the packer blade 30 takes place easily. When the rods 46 of the cylinders 44 are fully retracted (FIG. 3), the increase in pressure in the hydraulic system automatically switches controls to apply power to the two outboard, aligned cylinders 39 causing their rods 41 to be retracted, moving the slide blocks 35 downwardly in the guide tracks 36 to the position thereof shown in FIG. 4. However, because the cylinders 44 remain in retracted position and are pivotally connected to the packer blade 30 by the pins 31, the trailing edge 48 of the packer blade 30 moves along the curved path B-C to its rearward position above the hopper sill 24, shown in dotted lines in FIG. 3 and indicated as Position C.

Again, when the rods 41 of the cylinders 39 reach their fully retracted position, the increase in hydraulic pressure in the hydraulic circuit actuates the control valving to apply hydraulic pressure to the upper ends of the cylinders 44 to extend their rods 46, angularly swinging the packer blade 30 downwardly and forwardly on the pins 34 by which it is carried by the slide blocks 35. Extension of the piston rods 46 of the cylinders 44 moves the packer blade 30 along the path C-D until it reaches Position D (FIG. 4).

During this portion of the movement of the trailing edge 48 of the packer blade 30, considerable resistance to movement of the packer blade 30 is quite often encountered. Heavy objects such as sticks of wood, branches of trees, metal cans, heavy cartons and the like may overlie the hopper sill 24. By reason of the mechanical relationship of the mechanism embodying the instant invention, the cylinders 44 are able to exert very high force, effectively moving the trailing edge 48 of the packer blade 30 across the inner corner of the sill 24 as a shear, to break, cut or snap many of the objects which would otherwise cause a jam at this point.

As mentioned earlier, the tailgate 13 is rigidly braced so that sufficient strength exists in its sidewalls 17 and general structure that the reaction force of the cylinders 44 exerting pressure against objects which may overlie the sill 24 is applied directly to the tailgate structure itself to a considerably greater degree than such reactive forces are applied to the upper end of the packer blade 30 and thus through the slide blocks 35 to the guide tracks 36. That portion of this force which is applied to the slide blocks 35 acts in a downwardly direction and is resisted by the tailgate structure elements such as the cross channels 22 (see FIG. 1).

The curvature of the rearward portion 25 of the hopper bottom 23 is defined by the path of movement C-D of the trailing edge 48 of the packer blade 30. It is an arc described around the center of the packer blade pivot pins 34 (FIG. 7), when the slide blocks 35 are in their lowermost position in the guide tracks 36. Movement of the packer blade 30 along the path C-D from Position C to Position D (FIG. 4) effects some pre-compaction of objects such as cardboard cartons and the like because the components of force exerted by the packer blade 30 are in large measure perpendicular to the general extent of the forward, upwardly curved portion 26 of the hopper 23. Indeed, by comparing the position of the packer blade 30 relative to the forward portion 26 of the hopper 23 in both Position C (FIG. 3) and in Position D (FIG. 4), this pre-compaction or crushing action of the packer blade 30 will be apparent.

When the trailing edge 48 of the packer blade 30 reaches Position D in FIG. 4, the piston rods 46 of the rearwardly extending hydraulic cylinders 44 are fully extended. The increase in hydraulic pressure in the circuit resulting upon this full extension of the rods 46 again actuates the controls to apply hydraulic pressure to the lower end of the first set of hydraulic cylinders 39 to extend their piston rods 41 and to move the slide blocks 35 directly up the guide tracks 36, moving the packer blade 30 along the path D-A, gradually pivoting the packer blade 30 around its pivot pins 34 in the slide blocks 35 and progressively moving the packer blade through the intermediate positions indicated in broken lines in FIG. 4 as D-1 and D-2, finally reaching the uppermost and forwardmost Position A.

During the portion of the excursion of the packer blade from Position D to Position A, considerable resistance to its movement is encountered by reason of the continued pre-compaction action of the front panel 31 against the hopper portion 26 and apron 27 and against refuse which previously has been loaded into the rear of the body 11. During each loading cycle and particularly during that portion of the cycle wherein the trailing edge 48 of the packer blade moves along the path D-A, the ejector plate 18 (FIG. 1) functions as a movable restraining wall preventing previously transferred refuse from being pushed forwardly loosely into the body 11.

Each time that a charge of refuse is moved from the hopper 23 into the body 11, it is further compacted by the packer blade 30 against previously moved refuse and against the ejector plate 18. As subsequent charges of refuse are moved upwardly and forwardly by the packer blade 30, the refuse between the packer blade 30 and the ejector plate 18 becomes sufficiently dense that it cannot further be compacted and the packer blade 30 would not be able to finish its movement from Position D to Position A. At this point, the ejector plate 18 is moved forwardly in the body 11. This may be achieved either by manually actuating the controls for the hydraulic circuit to the ejector plate cylinder 19 or by so designing the hydraulic circuitry to the cylinder 19 that the application of the force exerted by the packer blade 30 through the dense refuse to the ejector plate 18 is sufficient to actuate the controls to the cylinder 19 to move the ejector plate 18 forwardly a distance sufficient to provide additional space behind the ejector plate 18 into which the packer blade 30 then can continue to pack refuse.

Because the instant application is not directed to the hydraulic circuitry or the control systems for either the ejector plate cylinder 19 or the packer blade actuating cylinders 39 or 44, and because the operation so far described of the hydraulic circuits is well known in the art, a further explanation is not made herein.

During the movement of the packer blade 30 from Position D to Position A the hydraulic cylinders 44 and their rods 46 act as counter force resisting struts. In other words, if movement of refuse being moved upwardly and forwardly out of the hopper 23 creates great resistance, force is transferred through the cylinders 44 to the side walls 17 of the hopper 13 and only a small portion of that reactive force is applied to the slide blocks 35 and then to the guide tracks 36. Again, such force as is applied acts in a downwardly direction by reason of the relative locations of the pivot pins 47 connecting the rods 46 to the packer blade 30 and the packer blade pivot pins 34 in the slide blocks 35. The bracing structural cross channels 22 again resist this force.

By reason of the mechanical arrangement so far described in which the first hydraulic cylinders 39 are aligned with the guide tracks 36 and apply their power directly to the lower rear sides of the slide blocks 35, no tilting or torquing force is applied to the slide blocks 35 by the cylinders 39. This eliminates any destructive forces being applied either to the slide blocks 35 or to their guide tracks 36. Because the force for moving the slide blocks 35 up the guide tracks 36 and thus for carrying the upper end of the packer blade 30 along the guide tracks 36 is an in-line application of force, applied below the slide blocks 35, a further advantage results. The upwardly and rearwardly extending hydraulic cylinders 44 are connected as mentioned between the packer blade 30 and the side walls 17 of the tailgate 13. Therefore the tendency of the packer blade to swing around the pivots 45 by which the rods 46 are connected thereto is minimized. Such reactive force as is created by the resistance to movement of the refuse is applied in major porportion directly to the tailgate structure rather than to the slides 35 and the guide tracks 36.

In contrast to the advantageous mechanical arrangement and structure of the instant invention, in the apparatuses of Gollnick U.S. Pat. No. 3,143,230, Appleman, et al. U.S. Pat. No. 3,615,028 and Anderson U.S. Pat. No. 3,615,029, where the power cylinders for angularly swinging the packer blade are mounted upon the slide mechanisms which travel along the guide tracks, a serious problem exists. In the mentioned patents when the packer blade (corresponding to the packer blade 30 of the instant invention) is swung through the portions of their paths corresponding to the path C-D and D-A, the reaction back upon the packer blade is delivered to the slide mechanisms and they are severely torqued around a horizontal axis extending transversely across the tailgate, parallel to the pivot line of the packer blade itself. All of this force is applied to the "carrier plate" of Gollnick U.S. Pat. No. 3,143,230 and the similar structures in Appleman and Anderson and is delivered to the guide tracks. This causes the "carrier plate" or similar structure to bind in the guide tracks and the force is delivered along the lines of contact of the slide rollers to the guide tracks.

In a rear loading refuse vehicle according to the instant invention, the application of force to the slide blocks in direct alignment with their guide tracks eliminates one source of difficulty and the application of packer blade swinging force from cylinders mounted on the strong side walls of the tailgate eliminates a second source of difficulty.

FALLBACK SHIELD

Because of the mechanical arrangement so far described as embodied in a rear loading refuse vehicle according to the invention, the area above the slide blocks 35 and the upper end of the packer blade 30 readily can be closed off by lightweight fallback shields which prevent refuse previously charged into the vehicle body 11 from falling backwardly over the packer blade when it is at the lower levels of its cycle. In this embodiment of the instant invention, each of the slide blocks 35 has an upwardly extending ear 49 (FIGS. 5 and 7) through which there extends a transverse bore in which there is positioned a pivot pin 50. The inner end of each of the pivot pins 50 extends through a collar 51 welded or otherwise secured to a side plate 52 of a side frame 53 of a lightweight, hollow fallback shield 54. The fallback shield 54 extends across the tailgate 13 and its side edges extend into the guide tracks 36.

Slide bearings 55 are bolted to the upper surface plate of the fallback shield 54 at each side and engage with the inner side of the wall 38 of the respective one of the guide tracks 36. The longitudinal length of the fallback shield 54 is such that when the slide blocks 35 and the packer blade 30 are at the lowermost end of their travel in the guide tracks 36, an upper edge 56 of the fallback shield 54 overlies a lower edge 57 of a stationary fallback shield 58 mounted in the tailgate and extending transversely across between its side walls 17 to which the stationary fallback shield 58 is rigidly connected. Thus, even when the slide blocks 35 and the packer blade 30 are at the lowermost end of their travel along the guide tracks 36, the travelling fallback shield 54 and the stationary fallback shield 58 fully close off the open end of the vehicle body 11 above the upper end of the packer blade 30. When the slide blocks 35 are moved to the upper end of their travel in the guide tracks 36 (FIG. 3), the travelling fallback shield 54 slides over the stationary fallback shield 58.

In order to prevent any sticky or tacky refuse from being carried upwardly on the under surface of the travelling fallback shield 54, a spring urged wiper 59 is mounted on the lower end of the stationary fallback shield 58, extending across the tailgate 13 with its free edge wiping the under surface of the travelling fallback shield 54.

A transversely extending filler 60 (FIGS. 5 and 7) is welded or otherwise rigidly attached at the lower end of the travelling fallback shield 54 extending downwardly adjacent the curved-over upper end of the front panel 31 of the packer blade 32 to prevent small pieces of refuse from being extruded, as it were, between the nearby edges of the packer blade 30 and travelling fallback shield 54.

A modified form of the construction is illustrated in FIGS. 8–10, inclusive, in which assembly of the travelling fallback shield in the tailgate 13 is facilitated. This assembly comprises a packer blade 30a substantially identical to the packer blade 30 shown in FIGS. 1–7, inclusive, but mounted and supported in a different fashion. As in the case of the packer blade 30, the packer blade 30a comprises a front panel 31a, reinforcing ribs 32a on the back side of the panel 31a and a heavy cross tube 33a. The packer blade 30a is pivotally supported by heavy pivot pins 34a which extend interiorly of the tube 33a some distance and which extend horizontally out of the tube 33a into sleeve bearings 61 at each side of the packer blade 30a. Each of the sleeve bearings 61 is welded or otherwise rigidly assembled near the lower end of an elongated slide 62 which takes the place of the earlier described block 35. The slides 62 are reciprocable in guide tracks 36a which are identical with the guide tracks 36 of the earlier embodiment of the invention. It will be observed, however, particularly in FIG. 8, that the slides 62 are hollow elongated boxes extending a considerable distance upwardly from the bearings 61 in the interiors of the guide tracks 36a.

A port 63 in the outer side wall of the guide track 36a near its lower end is provided in order to enable the pivot 34a to be inserted through the port 63, through the bearing 61 and into the open end of the packer blade support tube 33a from each side thus to mount the packer blade 30a in the apparatus. Stop pins 64 extend across the tube 33a at each side in order to prevent the pivots 34a from moving inwardly into the tube 33a.

In this embodiment of the invention, piston rods 41a of the first hydraulic cylinders 39a are connected to the lower ends of the slides 62 by cross pins 43a. After assembly of the packer blade 30a on its pivot pins 34a in the bearings 61, the ports 63 are closed by covers 65 (see FIG. 10).

A travelling fall-back shield 54a is hollow and rectangular in shape and has vertical channels 66 at its sides. The travelling fallback shield 54a is assembled between inner side walls 67 of the slides 62 and mounted thereon by pairs of machine bolts 68 which are inserted through matching holes in the channels 66 and the side walls 67.

This arrangement facilitates assembly because the slides 62 may be inserted upwardly into the guide tracks 36a through their open bottoms and the packer blade 30a first mounted as described above with the piston rods 41a being attached to the lower ends of the slides 62a. Afterwards, the travelling fallback shield 54a may be brought into the tailgate from the open rear end, moved up into place between the parallel slides 62 and bolted thereto.

As in the earlier described embodiment of the invention, the travelling fallback shield 54a has a tapered upper edge 56a which overlies a stationary fallback shield generally indicated by the reference number 58a.

Except for the differences in the precise construction and the resulting difference in the mode of assembly of the parts, the slides 62 function in the same fashion as the blocks 35 of the earlier described embodiment and the travelling fallback shield 54a functions in precisely the same manner as the travelling fallback shield 54 of the earlier embodiment. Indeed, in both constructions, the packer blade 30a may be identical.

Referring now to FIGS. 11, 12 and 13, and as described above, the slide blocks 35 are movable along the guide tracks 36 and the heavy pivot pins 34 for the packer blade 31 extend inwardly through slots 37 in the sidewalls 17 of the tailgate 13. Because refuse being packed in the vehicle body 11 has a tendency to expand backwardly when the packer blade 30 is moved upwardly and rearwardly to the position shown in FIGS. 3 and 11, some smaller pieces of refuse may enter the slots 37 at this time. In order to prevent such an occurrence, a refuse packing mechanism according to the invention may be provided with slot covers 69. Each of the slot covers 69 is an elongated U-shaped sheet of metal having a cross web and two side flanges and is connected at its upper end by pins 70, or the like, to the respective slide block 35. The slot cover 69 hangs downwardly from its block 35 and travels with the block 35 at the inner side of the respective cylinder 39 and its piston rods 41 so that when the block 35 is moved to the upper end of its path of travel (FIG. 11) the cover 69 extends over the slot 37 to prevent ingress of refuse.

As can be best seen in FIG. 13, two parallel retainers 71 are welded or otherwise secured to the walls 38 of the guide track 36 to hold the slot cover 69 inwardly with its lower end bearing against the outer surface of the tailgate wall 17 so that it will not rub against the surface of the power cylinder 39 or interfere with its piston rod 41.

Having described our invention we claim:

1. In a tailgate for a rear loading refuse body, said tailgate having parallel, spaced side walls and a generally rectangular packer blade extending across said tailgate between said side walls, the improvement comprising, mechanism for moving said packer blade in a packing cycle through said tailgate, said mechanism including,
    a. a linear guide track in each of said side walls leading upwardly and forwardly from the lower rear to the upper front thereof, each of said guide tracks including a slot in the respective one of said side walls,
    b. a pivot-member at each of the upper outer corners of said packer blade and extending outwardly through the respective one of said slots;
    c. a rectangular slide block on the outer end of each of said pivot members,
    d. each of said guide tracks also comprising an elongated three-sided guide overlying the respective one of said slots and consisting of upper and lower parallel sides closely embracing upper and lower surfaces of said slide block and an outer side closely engaging the outer side of said slide block, whereby said slide block is slidingly engaged with all three of said sides of said guide,
    e. first extensible power cylinder means mounted on the outer sides of said side walls and connected at their upper ends to the lower ends of said slide blocks and at their lower ends to the rear lower portions of said side walls in co-linear alignment with said guide tracks,
    f. A second pair of power cylinders pivotally mounted at one end adjacent the upper rear corners of said side walls and pivotally connected to said packer blade at a point between the upper and lower ends thereof,
    g. said pivots being mounted in said slide blocks at a horizontal pivot axis above the lower end of said slide blocks,
    h. said first extensible power cylinder means and said second power cylinders being sequentially energized for cycling said packer blade through a packing cycle.

2. A refuse packing mechanism according to claim 1 and a travelling fallback shield extending across the tailgate, said fallback shield being mounted on said slide members and extending upwardly away from the upper end of the packer blade.

3. Packer blade moving mechanism according to claim 2 in which the traveling fall-back shield is removably connected to the slide members whereby it may be inserted into the tailgate after the mounting therein of the packer blade and the slide blocks.

4. A refuse packing mechanism according to claim 2 and a stationary fallback shield mounted in the upper forward portion of the tailgate and extending thereacross, said fallback shield being overlapped.

5. Packer blade moving mechanism according to claim 4 and a resiliently urged wiper blade mounted on the lower end of the stationary fall-back shield and engaged with the front surface of the traveling fall-back shield.

* * * * *